United States Patent
Steinberg

(10) Patent No.: US 11,503,850 B2
(45) Date of Patent: Nov. 22, 2022

(54) HIGH SATURATED FAT MAYONNAISE

(71) Applicant: Dan Steinberg, Blacksburg, VA (US)

(72) Inventor: Dan Steinberg, Blacksburg, VA (US)

(73) Assignee: Fresh Twist Foods, Blacksburg, VA (US)

(*) Notice: Subject to any disclaimer, the term of this patent is extended or adjusted under 35 U.S.C. 154(b) by 1922 days.

(21) Appl. No.: 14/668,717

(22) Filed: Mar. 25, 2015

(65) Prior Publication Data

US 2015/0201658 A1 Jul. 23, 2015

Related U.S. Application Data

(63) Continuation-in-part of application No. 14/046,943, filed on Oct. 5, 2013, now abandoned.

(60) Provisional application No. 61/849,328, filed on Jan. 24, 2013, provisional application No. 61/848,474, filed on Jan. 4, 2013, provisional application No. 61/744,937, filed on Oct. 5, 2012.

(51) Int. Cl.
*A23L 27/60* (2016.01)

(52) U.S. Cl.
CPC ........... *A23L 27/60* (2016.08); *A23V 2002/00* (2013.01)

(58) Field of Classification Search
CPC ........ A23L 1/24; A23L 27/60; A23V 2002/00
See application file for complete search history.

(56) References Cited

FOREIGN PATENT DOCUMENTS

| EP | 1878786 A1 * | 1/2008 | ................ A23D 7/02 |
| WO | WO-2009111516 A2 * | 9/2009 | ........... A23D 7/0053 |

* cited by examiner

*Primary Examiner* — Erik Kashnikow
*Assistant Examiner* — Assaf Zilbering
(74) *Attorney, Agent, or Firm* — Dan Steinberg Esq

(57) ABSTRACT

A mayonnaise product in which the oil phase includes a combination of medium chain triglyceride (MCT) oil and a saturated fat such as butter oil, coconut oil, or palm oil, and further in combination with a high oleic oil. The MCT and high oleic oil reduces crystallization of the saturated fat when cooled, and consequently this improves emulsion stability. The oil phase preferably comprises at least about 70 or 75% saturated fat and less than 7%, 10% or 15% linoleic acid (omega-6), which provides exceptionally high resistance to lipid oxidation.

28 Claims, 1 Drawing Sheet

TOTOX values for coconut oil-based embodiment of present invention and other mayonnaise brands.
TOTOX = 2 x peroxide value + anisidine value

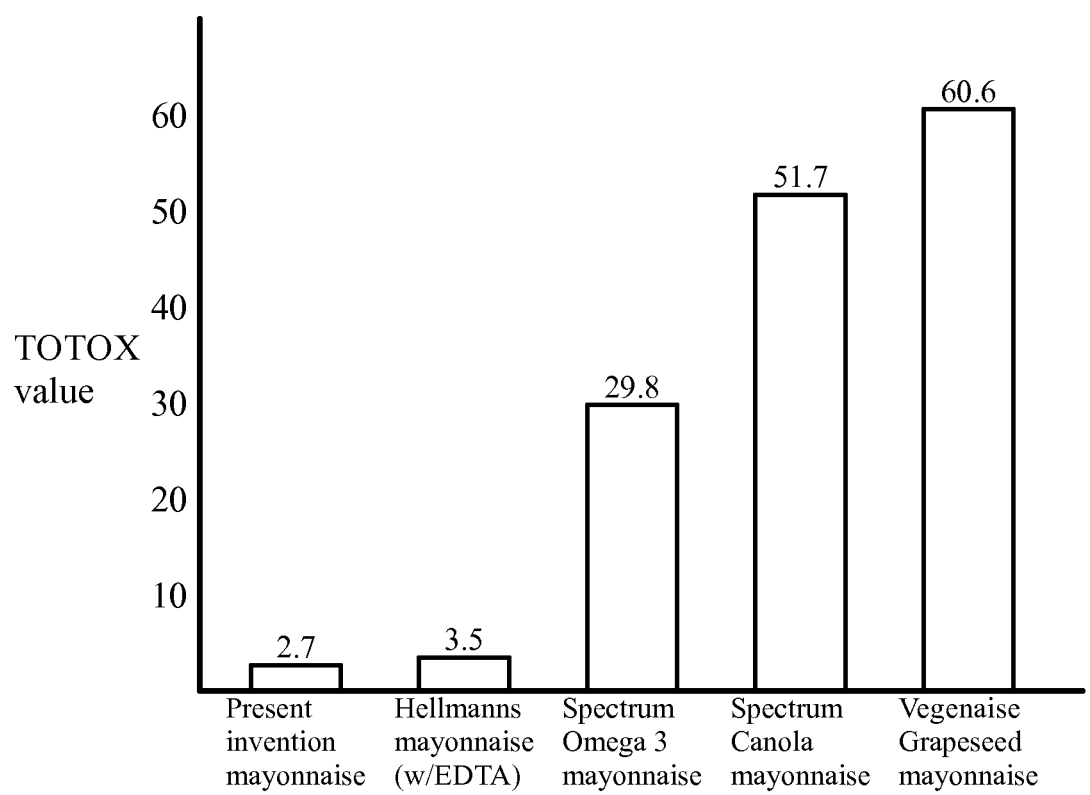
TOTOX values for coconut oil-based embodiment of present invention and other mayonnaise brands.
TOTOX = 2 x peroxide value + anisidine value

HIGH SATURATED FAT MAYONNAISE

RELATED APPLICATIONS

The present application is a continuation-in-part of copending application Ser. No. 14/046,943, filed on Oct. 5, 2013, which claims the benefit of priority from provisional patent application 61/744,937 filed on Oct. 5, 2012, 61/848,474 filed on Jan. 4, 2013, and 61/849,328 filed on Jan. 24, 2013.

FIELD OF THE INVENTION

The present invention relates generally to mayonnaise and oil-in-water emulsion mayonnaises. More specifically, the present invention relates to a mayonnaise product containing medium-chain triglyceride oil and a high-oleic (omega-9) oil in combination with a saturated fat such as butter, coconut oil, or lard.

BACKGROUND OF THE INVENTION

Awareness has been growing that saturated fats are not unhealthy and do not cause heart disease. Recent scientific papers have contradicted the long-held belief that saturated fats cause disease. See for example "*Meta-analysis of prospective cohort studies evaluating the association of saturated fat with cardiovascular disease*" Am. J. Clin. Nutr. 10.3945/ajcn.2009.27725 and "*Saturated fat and cardiovascular disease: The discrepancy between the scientific literature and dietary advice*" Nutrition Vol. 28 (2012) 118-123. Further, some studies demonstrate beneficial effects from saturated fat consumption, especially the medium chain triglycerides (with chain lengths of 8 carbons and 10 carbons, C:8 and C:10).

Also, in recent years there has been growing awareness of the dangers of excessive intake of omega-6 unsaturated fats, and oxidized fats. Omega 6 fats tend to promote inflammation. Also, omega-6 fats increase lipid oxidation in the body. These effects are harmful and promote diseases such as heart disease, metabolic disorders and cancer.

Almost all mayonnaise products are made with oils containing large amounts of omega-6 fats (linoleic acid), such as soybean oil, canola oil, peanut oil, cottonseed oil or the like. A growing number health-conscious people are avoiding the use of these high omega-6 vegetable oils. For example, those following a "paleo" diet avoid omega-6 vegetable oils, and prefer saturated fats.

Also, mayonnaise made with high omega-6 content is highly susceptible to oxidation. High omega-6 mayonnaises (with more than 40% or 50% omega-6) have high levels of health-damaging oxidation products unless preservatives are used. EDTA is a common and effective preservative for preventing iron-catalyzed lipid peroxidation, but EDTA is synthetic (i.e., non-naturally occurring), and therefore not welcome in the natural foods industry. For example, EDTA is forbidden by the Whole Foods grocery store chain and other natural foods retailers.

Mayonnaise can be made with olive oil, which has a relatively low omega-6 content of about 10%. However, unrefined olive oil has a strong flavor that can be overpowering in mayonnaise, since mayonnaise typically comprises at least about 65% oil. And the high omega-9 content of olive oil is susceptible to oxidation.

Mayonnaise cannot be made with a highly saturated fat (e.g. butter oil, coconut oil, or palm oil) because these fats crystallize strongly when refrigerated. This crystallization breaks the emulsion and causes the oil droplets to coalesce, which is highly undesirable in a mayonnaise product. Also, a mayonnaise made with butter oil, coconut oil, or palm oil will become too hard to spread when refrigerated; it can only be served after warming to room temperature. For these reasons, a mayonnaise made with highly saturated oils is not marketable.

Also, it is known in the food industry that coconut oil and other oils with a high medium chain triglyceride content do not form stable oil-in-water emulsions. These oils tend to produce emulsions that leak oil, even in the absence of oxidation or vibration.

Accordingly, there is a need for a stable mayonnaise with a high saturated fat content.

DESCRIPTION OF THE FIGURES

FIG. 1 shows total oxidation (TOTOX) values for a coconut oil version of the present mayonnaise, and several other mayonnaise products.

SUMMARY

The present invention includes an oil-in-water emulsion mayonnaise comprising a continuous acidic aqueous phase comprising egg yolks, egg whites or whole eggs, and a discontinuous oil phase comprising medium-chain triglyceride (MCT) oil, a saturated oil (SO), and a high omega-9 oil. The saturated oil is selected from the group consisting of butter oil, coconut oil, and palm oil. MCT oil and SO are present in a ratio in the range 35-65% MCT:35-65% SO. The high omega-9 oil comprises about 10-35% of the oil phase. The MCT oil and omega-9 oil inhibit fat crystallization and improve emulsion stability. The egg yolks are present in a high concentration in the range of at least 10% or 11% to about 16%.

The MCT and SO can alternatively be present in a ratio in the range 40-60% MCT:60-40% SO.

The saturated oil preferably has a saturated fat content of at least 60%, 70% or 80%.

The oil phase (comprising the saturated oil, MCT oil and high omega-9 oil), preferably comprises at least 60%, 70%, or 74% saturated fat.

The oil phase (comprising the saturated oil, MCT oil and high omega-9 oil), preferably comprises less than 15%, 10% or 7% omega-6.

Suitable high omega-9 oils include olive oil, high oleic sunflower oil, high oleic safflower oil, high oleic soybean oil, avocado oil and high oleic canola oil. The high omega-9 oil must comprise at least about 60%, 70%, or 80% omega-9.

The MCT oil content can be limited to less than 50%, 47%, 45% or 42%. Limiting the MCT oil tends to improve emulsion stability and reduce cost.

The present mayonnaise can also include up to about 0.2% sodium phytate, which inhibits iron-catalyzed lipid peroxidation, an effect known in the art.

DETAILED DESCRIPTION

The present invention provides a mayonnaise product with a high saturated fat content, and a low omega-6 content. The present mayonnaise has a stable emulsion that does not break or leak significantly even when exposed to multiple heating and cooling cycles (e.g. cycling between refrigeration and room temperature). Further, the present mayonnaise product is highly resistant to oxidation, due to its high saturated fat content, and low unsaturated and omega-6 content.

Saturated fats in butter, coconut oil or palm oil create emulsion stability problems when used in mayonnaise. Saturated fats crystallize when refrigerated and can even crystallize at room temperature. Fat crystals break an oil-in-water emulsion, causing oil leakage/separation and rendering the product undesirable to consumers. Also, saturated fats and especially medium chain saturated fats form unstable emulsions even without crystallization/freezing or temperature cycling. The medium chain saturated fats inherently cause oil droplet coalescence, which is highly undesirable in a mayonnaise product.

The present invention provides a high saturated fat mayonnaise product that does not suffer from these problems.

In mayonnaise made according to the present invention, the oil phase comprises a highly saturated oil (butter oil, coconut oil, or palm oil) in combination with medium-chain trilgyceride oil (MCT oil) and a high omega-9 oil. The MCT oil and omega-9 oil inhibit crystallization of the saturated fat, thereby greatly improving the emulsion stability. Also, the addition of MCT oil and omega-9 softens the mayonnaise, so that it is spreadable even when refrigerated. Hence, MCT and omega-9 stabilizes the emulsion during refrigeration.

The oil phase preferably comprises at least 60% or 70% or 74% saturated fat and less than 7% or 10% or 15% omega-6. With this fatty acid composition, the mayonnaise is highly resistant to lipid oxidation, even without EDTA or other preservatives.

An embodiment of the present invention comprises a uniquely high yolk content of at least 10% or 11%, and up to about 18%. A high yolk content counteracts the tendency of the MCT oil and saturated oil to destabilize the emulsion.

Definitions

Mayonnaise: An oil-in-water emulsion comprising at least 65% oil, an egg yolk emulsifier, and an acidified aqueous phase. Mayonnaises will typically comprise about 65-80% oil.

Butter oil: the lipid component of butter. Also known as clarified butter, anhydrous butter oil, or ghee. Whole butter typically comprises about 85% butter oil. Butter oil is typically about 60-70% saturated.

Medium-chain triglyceride oil (MCT): A triglyceride oil comprising more than 85% or 90% caprylic (C:8) and capric (C:10) fatty acids (in the form of triglycerides). MCT may also contain small amounts (less than 5%) of caproic (C:6) and lauric (C:12) acids. MCT oil is also sometimes referred to as "fractionated coconut oil", or "fractionated palm kernel oil". MCT is made from a light fraction of coconut and/or palm kernel oil. MCT oil is essentially 100% saturated. MCT is also known as medium chain triacylglycerols. MCT oil is typically made by transesterification.

Saturated oil (SO): A triglyceride fat comprising a high saturated fat content (e.g. greater than about 50% saturated). Examples include butter oil, coconut oil, or palm oil for example. An oil described as SO herein will typically not be 100% saturated. Butter oil is typically about 60-70% saturated, coconut oil is typically about 90% saturated, palm oil is typically about 50% saturated.

Omega-9 oil: A triglyceride comprising a high omega-9 fatty acid (oleic acid) content. Can be high oleic sunflower oil (min 80%, typically 90% oleic), high oleic safflower oil (77% oleic), high oleic soybean oil (75% oleic), or high oleic canola oil (70% oleic), or high oleic corn oil (65% oleic). Oils with higher oleic acid content, and lower omega-6 content are preferred. The omega-9 oil has at least 60%, 70% or 80% oleic acid, and preferably less than 20% or 10% omega-6 (linoleic acid)

Oil-in-water emulsion: An emulsion in which the aqueous phase is the continuous phase. An emulsion comprising oil droplets dispersed in an aqueous phase. Mayonnaise is an oil-in-water emulsion.

All percentages and ratios in the present description are by weight. Also, all percentages and weights of fatty acids, fats and oils are calculated as weight in triglyceride, not weight of the free fatty acids.

A mayonnaise according to the present invention comprises a discontinuous oil phase, a continuous aqueous phase, and an egg yolk emulsifier. The aqueous phase is acidic, as known in the art. The aqueous phase can contain lemon juice and/or vinegar (acetic acid), as known in the art. The aqueous phase can also contain other organic acids, such as citric acid, malic acid, phosphoric acid or mixtures thereof for example. The aqueous phase can have a pH in the range of about 3.2-4.2 or 3.7-4.0 for example. Also, the aqueous phase can contain flavor enhancing ingredients like salt, sugar, flavor extracts (e.g. lemon flavor), and mustard seed as known in the art.

The discontinuous oil phase in the present invention comprises 3 components: a saturated oil (SO) comprising at least 50% saturated fat, MCT oil, and a high omega-9 (high oleic acid) oil. The saturated oil can be coconut oil, butter oil or palm oil for example.

The oil phase can also contain a lipid-soluble antioxidant, such as vitamin E, as known in the art.

The saturated oil and MCT oil are present in a ratio of 35MCT/65SO to about 85MCT/15SO. Optionally, the ratio is about 40MCT/60SO to about 60MCT/40SO. These ratios do not include the omega-9 oil.

The omega-9 oil comprises 5-35% of the oil blend, with the saturated oil+MCT blend comprising the other 65-95%. With these ratios, the mayonnaise will have an ideal combination of high tolerance to temperature cycling (e.g. cycling between refrigerator and room temperatures), and high resistance to lipid oxidation/rancidity.

The MCT/SO/omega-9 oil blend will be mostly liquid at room temperature, though it may contain a small amount of fat crystals after standing at room temperature. The MCT/SO/omega-9 blend (in bulk, nonemulsified form) will tend to harden at refrigerator temperatures. The present inventor has surprisingly and unexpectedly discovered this only happens with the bulk oil, and does not happen with emulsified oil. Once the oil is emulsified in the mayonnaise, crystallization does not occur even when refrigerated at 2-4 C for weeks or months. This is a remarkable and unobvious discovery, and it is important for the stability and marketability of the present mayonnaise invention.

In specific embodiment, the oil phase comprises 80% 50-50 MCT/SO blend, and 20% of a high omega-9 oil, such as high oleic sunflower oil (with a 90% omega-9 content). In other words, this particular blend comprises 40% MCT, 40% saturated oil (e.g. coconut oil), and 20% high omega 9 oil.

The optimal amount of MCT oil and omega-9 oil depends on the crystallization tendency of the saturated fat, and the optional presence of other fats or oils. Fats with a higher saturated fat content and longer fatty acids have a stronger tendency to crystallize, and will therefore require a larger proportion of MCT and omega-9 oil. Also, the amount of MCT and omega-9 oil necessary will depend on the desired softness of the mayonnaise, and the desired emulsion stability. Softer mayonnaise will generally result from a higher proportion of MCT and omega-9 oils.

However, increasing the amount of omega-9 oil will tend to increase oxidation susceptibility. For this reason, it is preferred to limit the omega-9 oil to less than 35%, and limit omega-9 content to less than about 20%.

To limit oxidation to acceptable levels, it is preferred for the total content of omega-6 fat to be less than 15% or 10% of the oil, more preferably less than about 7%, and for the saturated fat content to be at least about 60% or 70% or 75%. High saturated fat, and low omega-6 in combination greatly reduce oxidation susceptibility. In the present invention, high saturated fat content, and low omega-6 content are preferred for the reduced oxidation susceptibility.

In an embodiment comprising 40% MCT oil, 40% coconut oil, and 20% high oleic sunflower oil, the omega-6 content will be about 4-6%, and the saturated fat content will be about 75%. These numbers are sufficient to provide high oxidation resistance and long shelf life.

MCT oil, like any naturally derived oil, contains a mixture of different fatty acids. MCT contains primarily (e.g. over 90%) caprylic (C:8) and capric (C:10) acids, and small amounts of other fatty acids. Caprylic acid is a smaller molecule, and therefore has a stronger crystallization-inhibiting effect than capric acid. Hence, slightly smaller amounts of MCT oil can be used if the MCT oil contains a higher proportion of caprylic acid. A typical MCT oil composition is C 6: 2%, C 8: 57%, C 10: 40%, and C 12: <1%. Some types of MCT oil can contain about 70% C8 and 30% C10. All these variations of MCT are within the scope of the present invention. At least about 85% or 90% of the MCT should comprise caprylic+capric acid-containing triglycerols.

The MCT-SO mixture is not transesterified. It is a mixture of triglycerides. The MCT oil ingredient may be a product of transesterification, however.

Total oil content of the mayonnaise can be about 65-85% or about 65-75%, as is typical for mayonnaises.

Highly saturated fats and in particular coconut and MCT oil create poor quality, unstable mayonnaise emulsions. This is particularly the case if the mayonnaise must be stable when exposed to temperature cycling (i.e. cycled between refrigerator and room temperatures).

However, the present inventor has discovered that the emulsion stability and quality are greatly improved by using a blend of saturated oil, MCT oil, and high oleic oil according to the present invention. Also, the present inventor has discovered that the emulsion instability caused by coconut and MCT oil can be ameliorated by using at least 10% egg yolks, or more preferably at least about 11% or 12% egg yolk. High egg yolk content ameliorates the instability problems caused by MCT and coconut oils. This amount of egg yolk is highly unusual in mayonnaise recipes, which typically have about 5-8% egg yolks. A 5-8% egg yolks content in combination with coconut and MCT oils produces a relatively unstable emulsion, but increasing the yolk content solves this problem.

Example 1

258 grams egg yolks
200 g whole eggs
100 g lemon juice
40 g water
75 g vinegar (5% strength)
25 g salt
12 g mustard seed powder
1020 g MCT oil
835 g Butter oil
205 g high oleic sunflower oil (77% oleic and 4% linoleic)
Method:
1) Blend yolks, whites, lemon juice, water, salt and mustard seed ingredients (aqueous ingredients). Vinegar not added at this time.
2) Combine MCT oil, melted butter oil, and high oleic sunflower oil. Blend oils to uniformity.
3) While vigorously blending aqueous ingredients, slowly add oil mixture.
4) After emulsion is formed, add vinegar and blend until uniform. If not all oil could be added in step 3, finish adding oil after the vinegar is added.
Total non-oil ingredients: 710 grams
Total oil ingredients: 2060 grams
Oil content: 74.4%
Yolk content: 11.8% (assuming whole eggs are 35% yolks by weight)
MCT/SO ratio: 55%/45%
High-oleic oil content: 10%
Saturated fat content of oil phase (assuming butter oil is 66% saturated, and MCT is 100% saturated, and high oleic sunflower is 11% saturated): 77.3%
Result: Stable mayonnaise with good resistance to oil leakage from temperature cycling. Also has excellent resistance to lipid oxidation.

Example 2

250 grams egg yolks
300 g whole eggs
20 g lemon juice concentrate
10 g sugar
40 g water
45 g vinegar (20% strength)
35 g salt
50 g prepared mustard
800 g MCT oil
700 g Coconut oil (91% saturated, 4% linoleic)
400 g high oleic sunflower oil (77% oleic and 4% linoleic)
Method:
1) Blend yolks, whites, lemon juice, water, salt and mustard seed ingredients (aqueous ingredients). Vinegar not added at this time.
2) Combine MCT oil, melted coconut oil, and high oleic sunflower oil. Blend to uniformity.
3) While vigorously mixing aqueous ingredients, slowly add oil mixture.
4) After emulsion is formed, add vinegar and blend until uniform. If not all oil could be added in step 3 (due to high viscosity), finish adding oil after the vinegar is added.
Total non-oil ingredients: 750 grams
Total oil ingredients: 1900 grams
Oil content: 71.7%
Yolk content: 13.4% (assuming whole eggs are 35% yolks)
MCT/SO ratio: 53.3%/46.6%
High-oleic oil content: 21%
Saturated fat content of oil phase (assuming coconut oil is 91% saturated and MCT is 100% saturated, and high oleic sunflower is 11% saturated): 77.8%
Result: Stable mayonnaise with good resistance to oil leakage from temperature cycling. Also has excellent resistance to lipid oxidation.

Example 3

250 grams egg yolks
300 g whole eggs 20 g lemon juice concentrate
10 g sugar
40 g water
45 g vinegar (20% strength)
35 g salt
50 g prepared mustard
0.5 g sodium phytate (optional)
650 g MCT oil
850 g Coconut oil (91% saturated, 4% linoleic)
300 g high oleic sunflower oil (77% oleic and 4% linoleic)
Method:
1) Blend yolks, whites, lemon juice, water, salt and mustard seed ingredients (aqueous ingredients). Vinegar not added at this time.
2) Combine MCT oil, melted coconut oil, and high oleic sunflower oil. Blend to uniformity.
3) While vigorously mixing aqueous ingredients, slowly add oil mixture.
4) After emulsion is formed, add vinegar and blend until uniform. If not all oil could be added in step 3 (due to high viscosity), finish adding oil after the vinegar is added.
Total non-oil ingredients: 750 grams
Total oil ingredients: 1800 grams
Oil content: 70.6%
Yolk content: 13.9% (assuming whole eggs are 35% yolks)
MCT/SO ratio: 43.3%/56.6%
High-oleic oil content: 16.6%
Saturated fat content of oil phase (assuming coconut oil is 91% saturated and MCT is 100% saturated, and high oleic sunflower is 11% saturated): 80.9%
Result: Stable mayonnaise with good resistance to oil leakage from temperature cycling. Also has excellent resistance to lipid oxidation.

Example 4

250 grams egg yolks
300 g whole eggs
20 g lemon juice concentrate
10 g sugar
40 g water
45 g vinegar (20% strength)
35 g salt
50 g prepared mustard
0.5 g sodium phytate (optional)
950 g MCT oil
700 g Palm oil (50% saturated, 9% linoleic, 40% omega-9)
150 g high oleic sunflower oil (77% oleic and 4% linoleic)
NOTE: Since palm oil typically contains about 40% omega-9, the amount of high oleic oil can be reduced, and the MCT amount increased.
Method:
1) Blend yolks, whites, lemon juice, water, salt and mustard seed ingredients (aqueous ingredients). Vinegar not added at this time.
2) Combine MCT oil, melted coconut oil, and high oleic sunflower oil. Blend to uniformity.
3) While vigorously mixing aqueous ingredients, slowly add oil mixture.
4) After emulsion is formed, add vinegar and blend until uniform. If not all oil could be added in step 3 (due to high viscosity), finish adding oil after the vinegar is added.
Total non-oil ingredients: 750 grams
Total oil ingredients: 1800 grams
Oil content: 70.6%
Yolk content: 13.9% (assuming whole eggs are 35% yolks)
MCT/SO ratio: 57.6%/42.4%
High-oleic oil content: 8.3%
Saturated fat content of oil phase (assuming MCT is 100% saturated, and high oleic sunflower is 11% saturated): 73.1%
Result: Stable mayonnaise with good resistance to oil leakage from temperature cycling. Also has excellent resistance to lipid oxidation.

In another aspect of the invention, the mayonnaise contains phytate ion, an iron-chelator that inhibits iron-catalyzed lipid peroxidation.

It has been discovered by the present inventor that sodium phytate, when added in an amount of 0.06-0.16% improves the emulsion stability and resistance to oil leakage from temperature cycling. Amounts of sodium phytate larger than about 0.2% tend to reduce emulsion stability. This is surprising and unexpected.

Sodium phytate is a preferred mineral chelator because it is a natural substance derived from rice bran and because it is effective at binding iron and inhibiting iron-catalyzed lipid peroxidation (though not as effective as EDTA). Sodium phytate can be added in an amount up to about 0.2%.

It is noted that phytic acid or other free phytate ion source can be used in place of sodium phytate. The sodium ion dissociates from the phytate ion. It is the phytate ion that chelates minerals and inhibits oxidation. Sodium phytate comprises about 70% by weight phytate ion and 30% by weight sodium. Accordingly, an amount of phytate ion equivalent to 0.06-0.16% sodium phytate is 0.042-0.112%.

The present inventor has discovered that mayonnaise made according to the present invention has a high resistance to oxidation and a long shelf life, even when EDTA or other preservatives are not present.

FIG. 1 for example shows results for TOTOX value testing for a coconut-oil based embodiment compared to other brands of mayonnaise. The mayonnaise of FIG. 1 has about 75% saturated fat, 5% omega-6, mixed tocopherols in the oil phase, and sodium phytate. TOTOX values were determined about 5 weeks after making the mayonnaise. The coconut-oil based embodiment had the lowest TOTOX value measured, slightly lower than Hellmanns mayonnaise, which contains EDTA. The present coconut-oil based mayonnaise is surprisingly and remarkably resistant to oxidation and rancidity.

Also, in some embodiments of the present invention, the MCT oil comprises less than about 50%, 47%, 45% or 42% of the oil phase. Limiting the MCT oil content to less than 50% of the oil phase tends to improve emulsion stability and reduce cost. For example, in an embodiment having a 50:50 MCT:SO ratio, and 25% high-oleic oil content, the MCT oil content will be 37.5%.

It will be clear to one skilled in the art that the above embodiments may be altered in many ways without departing from the scope of the invention. Accordingly, the scope of the invention should be determined by the following claims and their legal equivalents.

What is claimed is:
1. An oil-in-water emulsion mayonnaise, comprising:
1) a continuous, acidic aqueous phase with a pH in the range of 3.4-4.2;
2) egg yolks;
3) a discontinuous oil phase comprising emulsified oil droplets, comprising at least 65% of the mayonnaise, wherein the oil phase comprises:
a) a saturated fat blend comprising MCT oil and a saturated oil (SO) in a ratio of 35-65% MCT:35-65% SO, and wherein the saturated oil comprises at least 50% saturated fat;

b) a high oleic oil having an omega-9 content of at least 60%, and wherein the oil phase comprises 5-35% high oleic oil and 65-95% saturated fat blend;
and wherein the saturated oil is coconut oil.

2. The mayonnaise of claim 1 wherein the discontinuous oil phase has an omega-6 content of less than 12%.

3. The mayonnaise of claim 1 wherein the discontinuous oil phase has an omega-6 content of less than 7%.

4. The mayonnaise of claim 1 wherein the discontinuous oil phase has a saturated fat content of at least 70%.

5. The mayonnaise of claim 1 wherein the discontinuous oil phase has a saturated fat content of at least 74%.

6. The mayonnaise of claim 1 wherein the saturated oil has a saturated fat content of at least 60%.

7. The mayonnaise of claim 1 further comprising 0.06-0.16% sodium phytate or equivalent amount of phytate ion.

8. The mayonnaise of claim 1 wherein the egg yolks comprise at least 11% of the mayonnaise.

9. The mayonnaise of claim 1 wherein the MCT oil comprises 49% or less of the oil phase.

10. An oil-in-water emulsion mayonnaise, comprising:
1) a continuous, acidic aqueous phase with a pH in the range of 3.4-4.2;
2) egg yolks comprising 11% to 18% of the mayonnaise;
3) a discontinuous oil phase comprising emulsified oil droplets, comprising at least 65% of the mayonnaise, wherein the oil phase comprises:
a) a saturated fat blend comprising MCT oil and coconut oil in a ratio of 35-65% MCT:35-65% coconut oil, and wherein the coconut oil comprises at least 85% saturated fat;
b) a high oleic oil having an omega-9 content of at least 70%, and wherein the oil phase comprises 10-35% high oleic oil, and 65-90% saturated fat blend.

11. The mayonnaise of claim 10 wherein the discontinuous oil phase has a saturated fat content of at least 70%.

12. The mayonnaise of claim 10 wherein the discontinuous oil phase has a saturated fat content of at least 74%.

13. The mayonnaise of claim 10 wherein the egg yolks comprise at least 12% of the mayonnaise.

14. The mayonnaise of claim 10 wherein the discontinuous oil phase has an omega-6 content of less than 10%.

15. The mayonnaise of claim 10 wherein the MCT oil comprises 49% or less of the oil phase.

16. The mayonnaise of claim 10 wherein the mayonnaise does not contain EDTA.

17. An oil-in-water emulsion mayonnaise, comprising:
1) a continuous, acidic aqueous phase with a pH in the range of 3.4-4.2;
2) egg yolks comprising 11% to 18% of the mayonnaise;
3) a discontinuous oil phase comprising emulsified oil droplets, comprising at least 65% of the mayonnaise, wherein the oil phase comprises:
a) a saturated fat blend comprising MCT oil and coconut oil in a ratio of 35-65% MCT:35-65% coconut oil, and wherein the coconut oil comprises at least 85% saturated fat;
b) a high oleic oil having an omega-9 content of at least 70%, and wherein the oil phase comprises 10-35% high oleic oil, and 65-90% saturated fat blend, and
wherein the oil phase has an omega-6 content of less than 10% and a saturated fat content of at least 70%, wherein the MCT oil comprises 45% or less of the oil phase, and wherein the mayonnaise does not contain EDTA.

18. The mayonnaise of claim 17 wherein the discontinuous oil phase has a saturated fat content of at least 74%.

19. The mayonnaise of claim 17 wherein the egg yolks comprise at least 12% of the mayonnaise.

20. The mayonnaise of claim 1 wherein the high oleic oil has an omega-9 content of at least 80%.

21. The mayonnaise of claim 10 wherein the high oleic oil has an omega-9 content of at least 80%.

22. The mayonnaise of claim 17 wherein the high oleic oil has an omega-9 content of at least 80%.

23. The mayonnaise of claim 1 wherein the discontinuous oil phase comprises at least 3.5% myristic acid (C14:0).

24. The mayonnaise of claim 10 wherein the discontinuous oil phase comprises at least 3.5% myristic acid (C14:0).

25. The mayonnaise of claim 17 wherein the discontinuous oil phase comprises at least 3.5% myristic acid (C14:0).

26. The mayonnaise of claim 1 wherein the discontinuous oil phase comprises less than 11% long chain saturated fatty acids with chain lengths of C16 or greater.

27. The mayonnaise of claim 10 wherein the discontinuous oil phase comprises less than 11% long chain saturated fatty acids with chain lengths of C16 or greater.

28. The mayonnaise of claim 17 wherein the discontinuous oil phase comprises less than 11% long chain saturated fatty acids with chain lengths of C16 or greater.

* * * * *